United States Patent
Hall et al.

(10) Patent No.: US 11,371,608 B2
(45) Date of Patent: Jun. 28, 2022

(54) PARK LOCK ARRANGEMENT

(71) Applicant: Volvo Car Corporation, Gothenburg (SE)

(72) Inventors: Tommie Hall, Hisings Backa (SE); Rafal Kisielewicz, Olofstorp (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/871,248

(22) Filed: May 11, 2020

(65) Prior Publication Data

US 2020/0378497 A1   Dec. 3, 2020

(30) Foreign Application Priority Data

Jun. 3, 2019   (EP) .................................... 19177856

(51) Int. Cl.
*F16H 63/34*   (2006.01)
*B60T 1/00*   (2006.01)

(52) U.S. Cl.
CPC .......... *F16H 63/3433* (2013.01); *B60T 1/005* (2013.01); *F16H 63/3425* (2013.01); *F16H 63/3416* (2013.01)

(58) Field of Classification Search
CPC ............. F16H 63/3433; F16H 63/3425; F16H 63/3416; B60T 1/005
See application file for complete search history.

(56) References Cited

U.S. PATENT DOCUMENTS

| | | | | |
|---|---|---|---|---|
| 3,116,815 A | * | 1/1964 | Chapman, Jr. | .......... B60T 1/005 188/106 R |
| 3,690,416 A | * | 9/1972 | Katsuo | .................... B60T 1/005 188/69 |
| 4,310,081 A | | 1/1982 | Kolacz | |
| 4,369,867 A | | 1/1983 | Lemieux | |
| (Continued) | | | | |

FOREIGN PATENT DOCUMENTS

| | | |
|---|---|---|
| CN | 201836362 U | 5/2011 |
| CN | 103807434 A | 5/2014 |
| (Continued) | | |

OTHER PUBLICATIONS

Nov. 19, 2019 International Search Report issued on European Application No. 19177856.
(Continued)

*Primary Examiner* — Mark A Manley
(74) *Attorney, Agent, or Firm* — Clements Bernard Walker; Christopher L. Bernard

(57) ABSTRACT

In the park lock arrangement according to embodiments, a pivoting park pawl is arranged with a roller member against which a lower bearing surface of an actuating member is configured to bear for controlling the park pawl to pivot between a park release position and a park lock position. An upper bearing surface of the actuating member is further configured to bear against an actuator support roller being configured to assist the actuating member in pressing against the roller member of the park pawl to cause the park pawl to pivot. The roller member and the actuator support roller will decrease frictional force arising when the actuating member moves into contact with the roller member for pivoting the park pawl.

20 Claims, 5 Drawing Sheets

(56) References Cited

U.S. PATENT DOCUMENTS

| | | | | |
|---|---|---|---|---|
| 5,531,303 | A | * 7/1996 | Raszkowski | B60T 1/005 188/31 |
| 8,146,728 | B2 | 4/2012 | Reichert | |
| 2006/0163024 | A1* | 7/2006 | Yamamoto | B60T 1/062 192/219.4 |
| 2014/0083238 | A1* | 3/2014 | Rhoades | B60T 7/02 74/519 |
| 2017/0016534 | A1* | 1/2017 | Mukai | B60T 1/062 |
| 2018/0172154 | A1 | 6/2018 | Nakai et al. | |

FOREIGN PATENT DOCUMENTS

| | | |
|---|---|---|
| CN | 203656168 U | 6/2014 |
| CN | 102720834 B | 8/2015 |
| CN | 105387202 A | 3/2016 |
| CN | 205118224 U | 3/2016 |
| CN | 107499292 A | 12/2017 |
| CN | 207018499 U | 2/2018 |
| CN | 207093744 U | 3/2018 |
| CN | 107923530 A | 4/2018 |
| CN | 207454754 U | 6/2018 |
| CN | 108278365 A | 7/2018 |
| CN | 207569181 U | 7/2018 |
| CN | 208845705 U | 5/2019 |
| DE | 10144063 A1 | 3/2003 |
| EP | 2410214 A2 | 1/2012 |
| JP | 2003506639 A | 2/2003 |
| JP | 2013095251 A | 5/2013 |
| WO | 2018095478 A1 | 5/2018 |

OTHER PUBLICATIONS

Abstract from International Application No. 19177856.2.
First office action and search report issued in the corresponding CN application No. 202010472430.9.

* cited by examiner

PARK LOCK ARRANGEMENT

CROSS-REFERENCE TO RELATED APPLICATION

The present disclosure claims the benefit of priority of co-pending European Patent Application No. 19177856.2, filed on Jun. 3, 2019, and entitled "PARK LOCK ARRANGEMENT," the contents of which are incorporated in full by reference herein.

TECHNICAL FIELD

The present disclosure relates to a park lock arrangement configured to be used in a park lock system of a vehicle.

BACKGROUND

Vehicles having an automatic transmission, or electric vehicles, are provided with a park lock function adapted to lock the output shaft of the automatic transmission or the output shaft of the electric motor, which prevents the vehicle from moving in any direction. A parking pawl prevents the transmission from rotating, and therefore the vehicle from moving. The parking pawl locks the output shaft of the transmission to the transmission casing or the output shaft of the electric motor by engaging a pawl (i.e. a wedge-like element) that engages with a parking gear (a notched wheel) arranged on the output shaft, thereby preventing the gear—and thus the driving wheels—from rotating. The parking pawl will lock the shaft when it is moved in position between two teeth of the parking gear.

The parking pawl is prevented from being engaged during driving or when the vehicle is moving. On a vehicle having an automatic transmission, this may be done by blocking the gear selector until a safe engagement speed for the vehicle is reached. Software may also be used to control that this condition is avoided and that the pawl can only be engaged when the vehicle has come to a standstill.

A great torque must be produced by an actuator when an actuating member of a park lock system is moved from a park lock position to a park release position mode upon the vehicle e.g. being parked in a slope due to the great radial force acting on the actuating member from the parking gear and the park pawl.

SUMMARY

One objective is to solve, or at least mitigate, this problem and thus to provide an improved park lock arrangement.

In the park lock arrangement according to embodiments, a pivoting park pawl is arranged with a roller member against which a lower bearing surface of an actuating member is configured to bear for controlling the park pawl to pivot between a park release position and a park lock position. An upper bearing surface of the actuating member is further configured to bear against an actuator support roller being configured to assist the actuating member in pressing against the roller member of the park pawl to cause the park pawl to pivot. The roller member and the actuator support roller will decrease frictional force arising when the actuating member moves into contact with the park pawl for causing the park pawl to pivot and thus decrease the torque required by an actuator for moving the actuating member from the park lock position to the park release position.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DESCRIPTION OF EMBODIMENTS

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
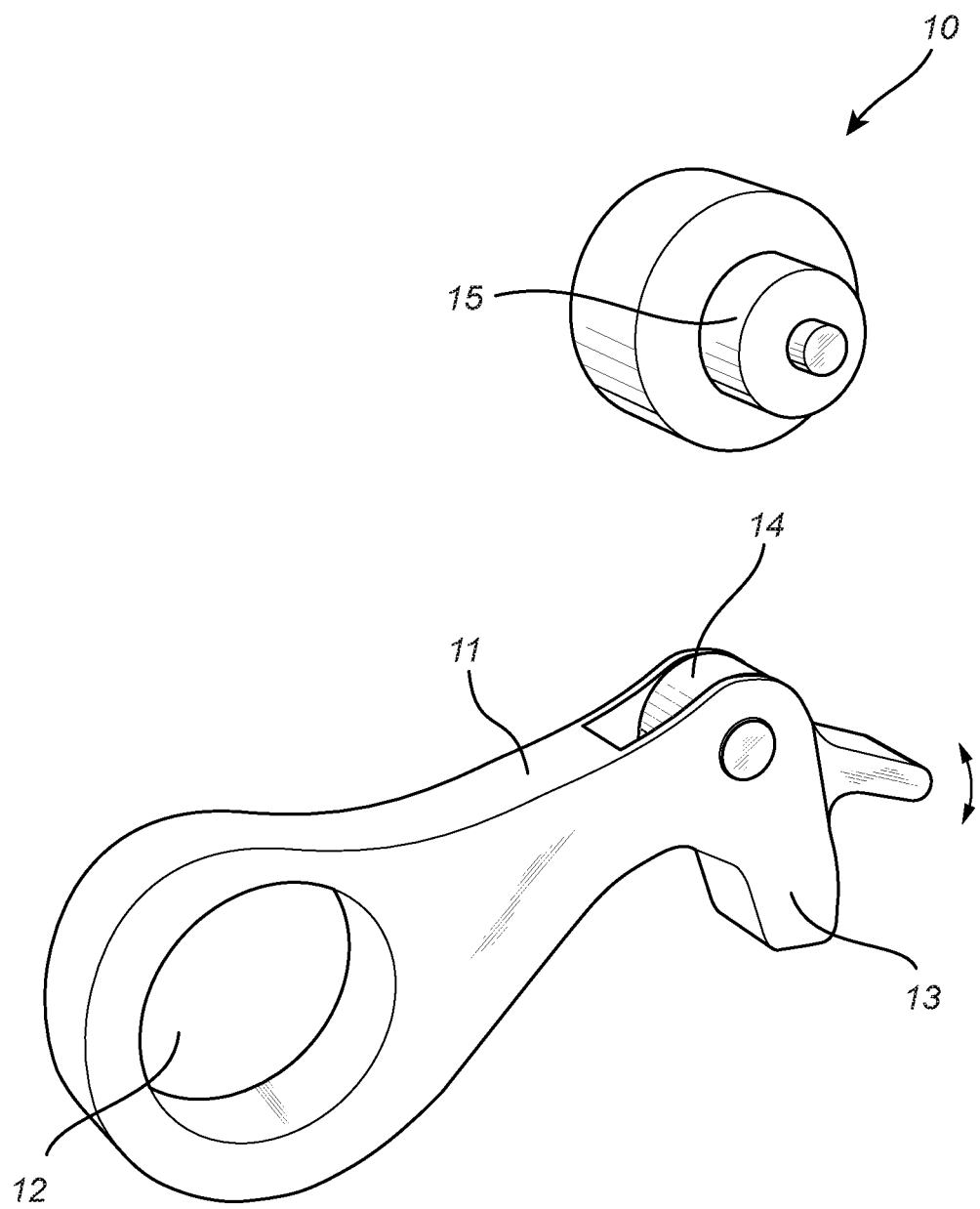
FIG. 1 shows a perspective view of a park lock arrangement according to an embodiment, which park lock arrangement is configured to be used in a park lock system of a vehicle.

FIG. 1 shows a perspective view of a park lock arrangement 10 according to an embodiment configured to be used in a park lock system of a vehicle as will be described in more detail in the following.

The park lock arrangement 10 comprises a park pawl 11 which is pivotably arranged around a pivot axis 12 to move between a park release position and a park lock position when being controlled by an actuating member (not shown in FIG. 1) to pivot between the two positions.

Hence, the park pawl 11 will pivot in a clockwise direction when being moved into the park lock position, and a lock end 13 of the park pawl 12 will move in a downwards direction and into engagement with a space between two teeth of a parking gear of a vehicle to be parked (such as for example a car).

The park pawl 11 is arranged with a roller member 14 against which a lower bearing surface of the actuating member is configured to bear.

Further, the park lock arrangement 10 comprises an actuator support roller 15 against which an upper bearing surface of the actuating member is configured to bear.

Figure 2:
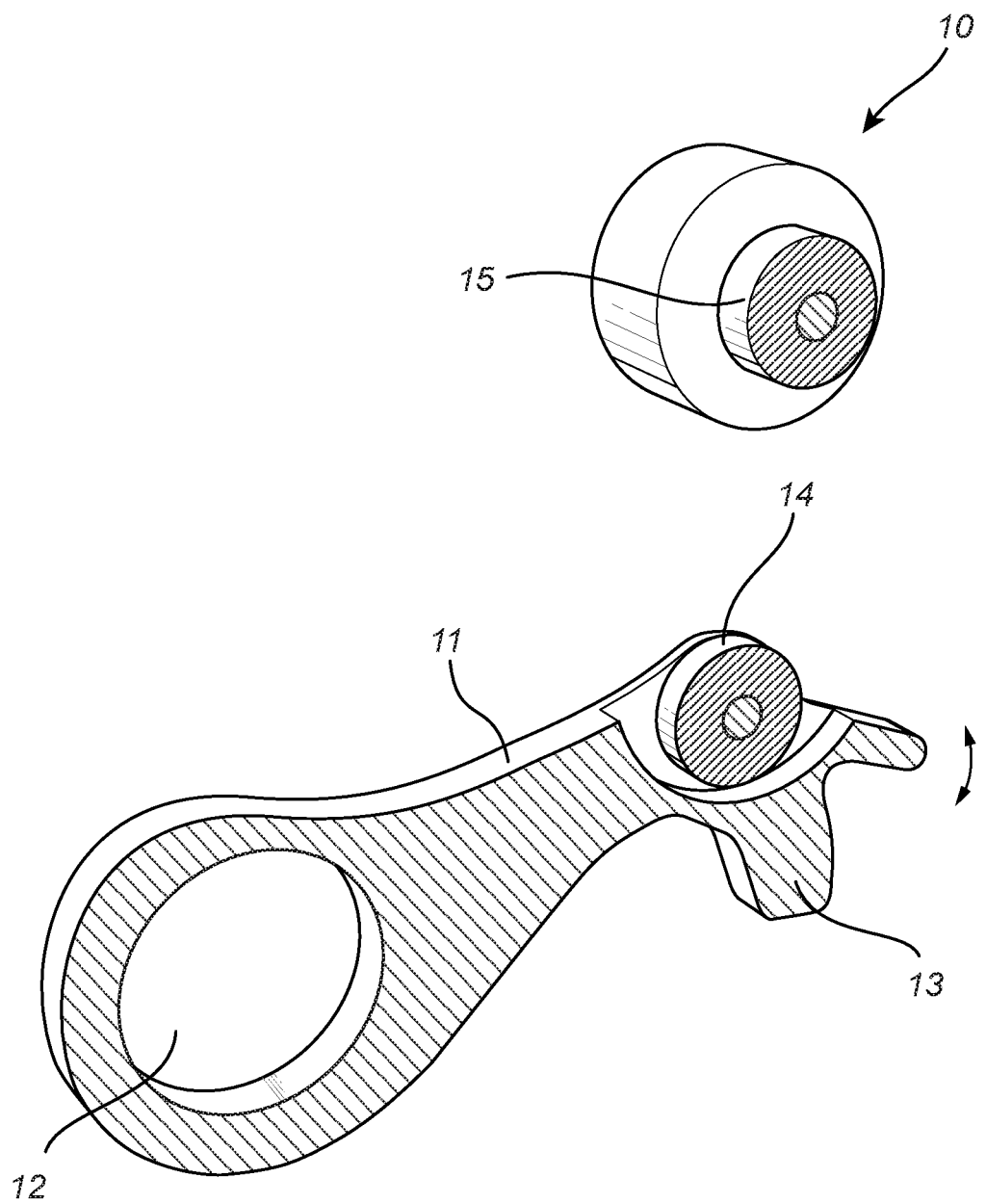
FIG. 2 shows the park lock arrangement of FIG. 1 in a sectional view.

FIG. 2 shows a perspective sectional view of the park lock arrangement 10 of FIG. 1, where it is illustrated that the roller member 14 of the park pawl 11 is capable of freely rotating inside the park pawl 11.

Figure 3:
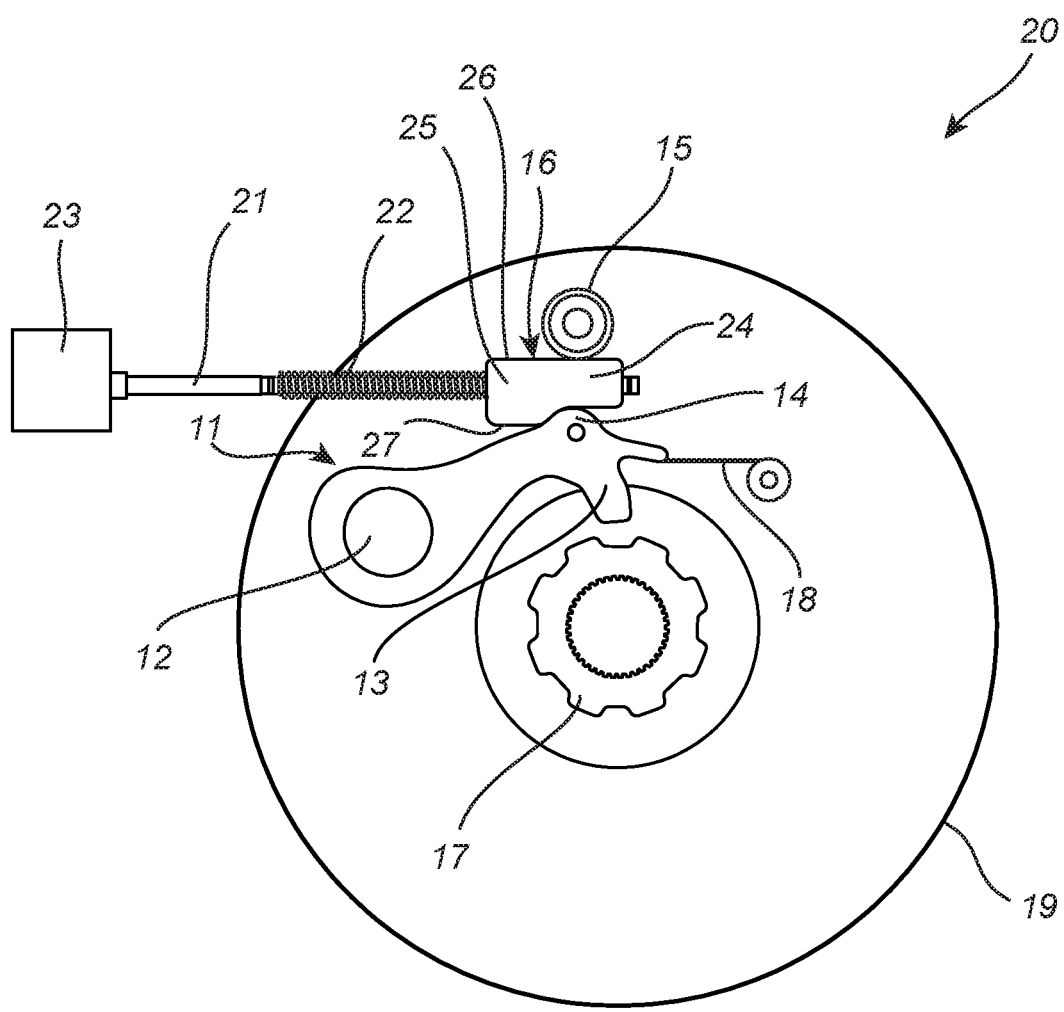
FIG. 3 shows a park lock system according to an embodiment, in which the park lock arrangement of FIG. 1 is implemented, where the park pawl is in a park release position.

FIG. 3 illustrates the park lock arrangement of FIG. 1 in a side view when interacting with an actuating member 16 to engage with a parking gear 17 of a vehicle, such as a car, to form a park lock system 20. As can be seen, the actuating member 16 controls the movement of the park pawl 11 from a left-hand side but could alternatively control the movement of the park pawl 11 from a right-hand side.

In FIG. 3, the park pawl 11 is in the park release position. As can be seen, a spring arrangement 18 is arranged to move the park pawl 12 to the release position and keep it in the release position when the actuating member 16 is not pressing on the park pawl 11 to cause it to pivot in a clockwise direction.

The spring arrangement 18 of FIG. 3 is formed by a return spring, which is attached to the park pawl 11 in one end and to a transmission housing 19 of the vehicle in the other and will thus pull the park pawl 11 in an upwards direction when the pressure of the actuating member 16 pressing the park pawl 11 downwards into the park lock position is released.

Further, the actuator support roller 15 is attached to the transmission housing 19, and the park pawl 11 is attached to the transmission housing 19 at its pivot axis 12 while still being able to pivot around the pivot axis 12.

The actuating member 16 is arranged on an actuator rod 21 extending in a horizontal direction. The actuating member 16 is capable of sliding on the actuator rod 21 and is pushed to the end of the actuator rod 21 by an actuator spring 22. The actuator rod 21 is controlled by an actuator 23, which may be e.g. an electromagnetic solenoid or a rotating motor. The actuator 23 is controlled by a control system of the vehicle in which the park lock system 20 is arranged and is activated when a transmission shift selector is placed in park position, or when an electric vehicle is parked.

Further, the actuating member 16 comprises a body with a release section 24 and a lock section 25.

An upper bearing surface 26 of the actuating member 16 is configured to bear against the actuator support roller 15, which actuator support roller 15 is utilized to assist the actuating member 16 in exerting a force onto the park pawl 11 to have the park pawl 11 pivot in a clockwise direction and hence to cause the lock end 13 to move downwards when the actuating member 16 moves in a right-hand direction.

The actuator support roller 15 thus provides support to the actuating member 16, which otherwise would rise in an upwards direction upon the lock section 25 moving into contact with the park pawl 11 via a lower bearing surface 27 of the actuating member 16 bearing against the roller member 14 of the park pawl 11.

Figure 4:
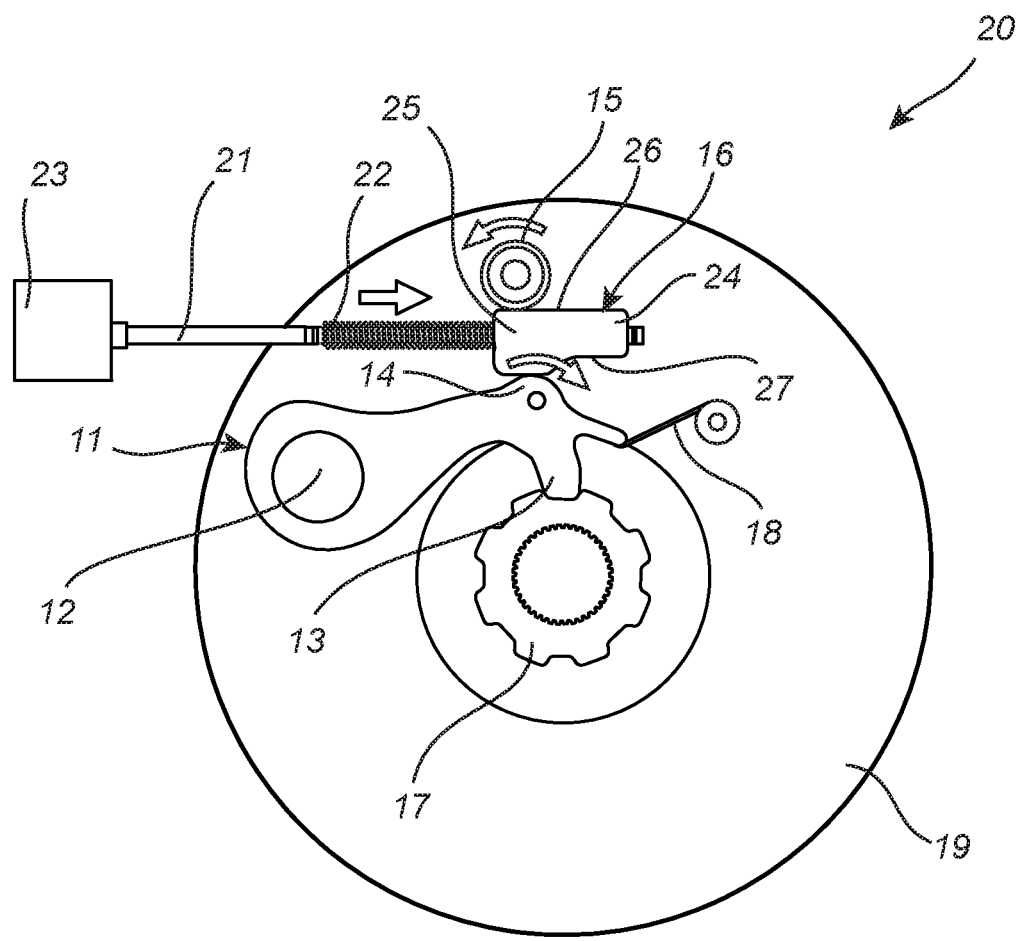
FIG. 4 shows a park lock system according to an embodiment, in which the park lock arrangement of FIG. 1 is implemented, where the park pawl is in a park lock position.

FIG. 4 shows the park lock system 20 of FIG. 3 in a side view where the actuating member 16 controls the park pawl 11 to move into the park lock position.

The actuator 23 thus controls the actuating member 16 to move in a right-hand direction to force the park pawl 11 to pivot in a clockwise direction and hence to cause the lock end 13 to move downwards. In other words, the spring force of the actuator spring 22 will overcome the force of the return spring 18 and the friction of the park pawl 11.

Hence, when the release section 24 of the actuating member 26 is located between the actuator support roller 15 and the roller member 14 of the park pawl 11, i.e. where the actuating member 16 does not exert pressure on the park pawl 11, the spring arrangement 18 holds the park pawl 11 in the park release position. However, upon the actuating member 16 being controlled by the actuator 23 to move in a right-hand direction, such that the lock section 25 moves into position between the actuator support roller 15 and the roller member 14 of the park pawl 11, the lock section 25 of the actuating member 16 in cooperation with the actuator support roller 15 will force the park pawl 11 to pivot in a clockwise direction such that the lock end 13 moves in a downward direction.

The lock end 13 of the park pawl 11 will thus engage with a space between two teeth of the parking gear 17 and the parking lock of the vehicle is activated. When the actuating member 16 is moved from the park release position to the park lock position and the park pawl 11 is positioned such that the lock end 13 will bear on a top surface of a tooth of the parking gear 17, the park pawl 11 cannot be pushed down between the teeth of the parking gear 17. The park pawl 11 will be pushed down somewhat, and the lock section 25 of the actuating member 16 will bear on the park pawl 11. The actuator spring 22 will be compressed, and the actuator rod 21 will partly slide through the opening in the actuating member 16. If the vehicle moves slightly, the parking gear 17 will rotate slightly such that the park pawl 11 will be pushed down between the teeth of the parking gear 17 by the actuating member 16.

Now, as the actuating member 16 is moved from left to right to activate the park lock, and from right to left to release the park lock, a great force acts on the actuating member 16 from the parking gear 17 and the park pawl 11.

Consequently, the great frictional force to overcome for moving the actuating member 16 back and forth requires a high torque to be produced by the actuator 23.

Thus, with the roller member 14 on the park pawl 11 and the actuator support roller 15, a relatively low rolling frictional force advantageously needs to overcome in contrast to a much greater sliding frictional force which would arise in a situation where the two rollers are not included in the park lock arrangement.

As is illustrated in FIG. 4, as the actuating member 16 is controlled by the actuator 23 via the rod 21 to move in a left-hand direction, the upper bearing surface 26 of the actuating member 16 bears against the actuator support roller 15 and thus causes the actuator support roller 15 to rotate in a counter-clockwise direction, while the lower bearing surface 27 of the actuating member 16 bears against the roller member 14 of the park pawl 11 and thus causes the roller member 14 to rotate in a clockwise direction.

The rolling friction of the actuator support roller 15 and the roller member 14 should preferably be low to facilitate back-and-forth movement of the actuating member 16 to move the park pawl 11 in and out of the park lock position.

It should be noted that a great force acts on the park pawl 12 and thus the actuating member 22 and the actuator support member 27 when the park pawl 12 is forced upwards upon the vehicle for instance being parked in a slope where the weight of vehicle effectively acts on the park pawl 12.

The actuator support roller 15 will bear against the upper bearing surface 26 of the actuating member 16 and will provide a support when pushing the park pawl 11 into the park lock position. The actuator support roller 15 will also bear against the actuating member 16 when the park pawl 11 is in the park release position, where the actuating member 16 is pushed towards the actuator support roller 15 by the return spring 18.

The actuator support roller 15 must be able to withstand the great radial force acting on it from the park pawl 11 and the parking gear 17 when the vehicle e.g. is parked in a slope.

Low rolling friction of the roller member 14 of the park pawl 11 and the actuator support roller 15 will advantageously facilitate movement of the actuating member 16 in a left-hand direction as the force required to move the actuating member 16 into the park release position is greatly decreased with the roller member 14 and the actuator support roller 15.

Correspondingly, low rolling friction of the roller member 14 of the park pawl 11 and the actuator support roller 15 will advantageously facilitate movement of the actuating member 16 in a right-hand direction as the force required to move the actuating member 16 into the park lock position is greatly decreased with the roller member 14 and the actuator support roller 15.

The park pawl 11, roller member 14 and the actuator support roller 15 are preferably made from a metal and may e.g. be made of forged steel or sintered steel. The park pawl 11 must be able to withstand the forces from the parking gear 17 when the vehicle is parked e.g. in a slope.

Figure 5:
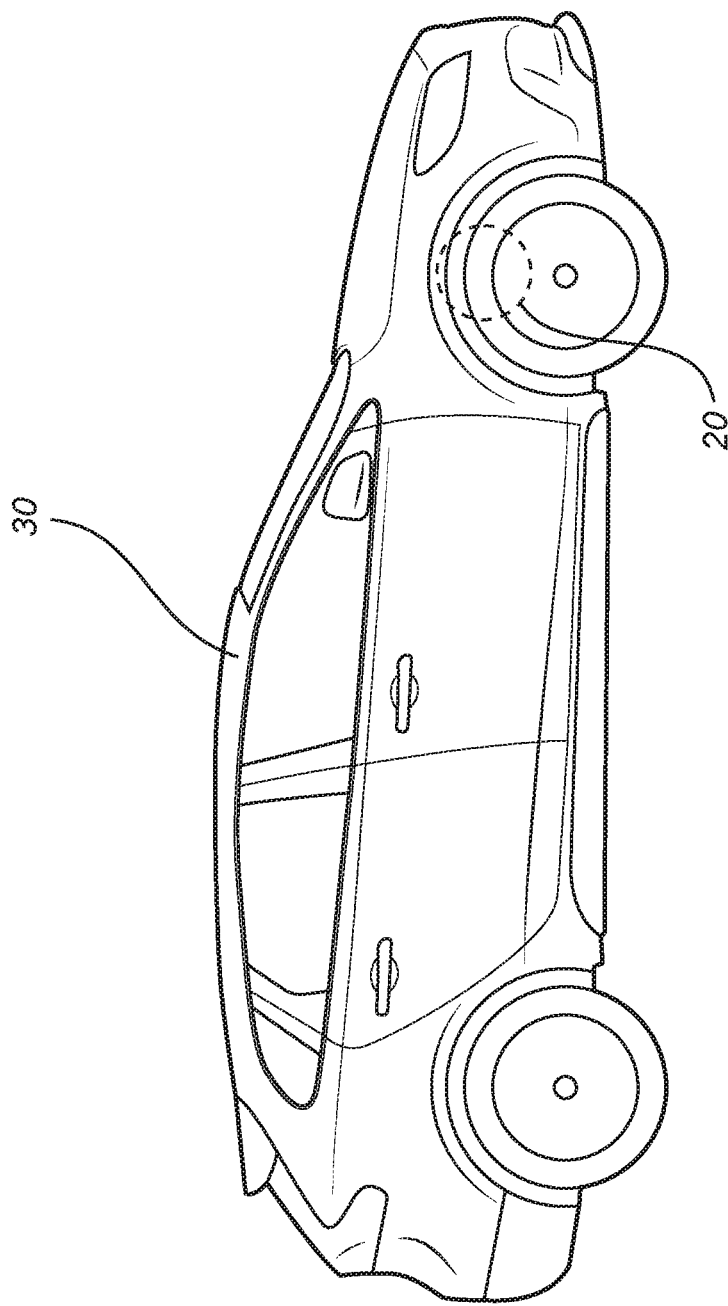
FIG. 5 illustrates a vehicle in which the park lock arrangement according to embodiments can be implemented.

FIG. 5 illustrates a vehicle in the form of a car 30 in which the park lock system 20 according to embodiments may be implemented.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A park lock system of a vehicle, comprising:
an actuating member;
a park pawl pivotably arranged to move between a park release position and a park lock position upon being controlled by the actuating member causing the park pawl to pivot, the park pawl further being arranged with a roller member rotatably attached to the park pawl against which a lower bearing surface of the actuating member is configured to bear, wherein the actuating member moves horizontally, only along a longitudinal direction of the park pawl; and
an actuator support roller against which an upper bearing surface of the actuating member is configured to bear, wherein the upper bearing surface of the actuating member is opposed to the lower bearing surface of the actuating member, and which is configured to assist the actuating member in pressing against the roller member of the park pawl to cause the park pawl to pivot, wherein the actuating member is configured to move horizontally from a first position to a second position such that a release section and a lock section of the actuating member move horizontally and engage the roller member of the park pawl in succession for controlling the park pawl to pivotally move to the park lock position and configured to move horizontally from the second position to the first position such that the lock section and the release section of the actuating member move horizontally and engage the roller member of the park pawl in succession for controlling the park pawl to pivotally move to the park release position;
wherein the roller member and the actuator support roller decrease frictional force arising when the actuating member moves horizontally into contact with the park pawl, only along the longitudinal direction of the park pawl, for causing the park pawl to pivot.

2. The park lock system of claim 1, further comprising:
a spring arrangement arranged to move the park pawl to the park release position upon the actuating member not causing the park pawl to pivot to the park lock position.

3. The park lock system of claim 2, wherein the spring arrangement comprises a return spring configured to be attached to the park pawl in one end and attached to the vehicle in another end.

4. The park lock system of claim 1, further comprising an actuator connected to the actuating member and being configured to cause the park pawl to pivot.

5. The park lock system of claim 4, further comprising:
an actuator rod via which the actuator is connected to the actuating member.

6. The park lock system of claim 5, wherein the actuating member is slidably arranged on the actuator rod.

7. The park lock system of claim 5, wherein the lower bearing surface of the actuating member is configured to be downwardly inclining in an axial direction from the park pawl to the actuator along the actuator rod.

8. The park lock system of claim 1, the actuating member comprising:
the release section, the upper bearing surface of which is configured to bear against the actuator support roller and the lower bearing surface of which is configured to bear against the roller member when the park pawl is in the park release position; and
the lock section, the upper bearing surface of which is configured to bear against the actuator support roller and the lower bearing surface of which is configured to bear against the roller member when the park pawl is in the park lock position, wherein the lower bearing surface is configured to be downwardly inclining from the release section to the lock section.

9. The park lock system of claim 1, wherein the upper bearing surface of the actuating member is configured to be planar.

10. The park lock system of claim 1, wherein the park pawl comprises a lock end configured to move into engagement with a space between two teeth of a parking gear of the vehicle upon the park pawl being moved into the park lock position by the actuating member.

11. A vehicle, comprising:
a park lock system, comprising:
an actuating member;
a park pawl pivotably arranged to move between a park release position and a park lock position upon being controlled by the actuating member causing the park pawl to pivot, the park pawl further being arranged with a roller member rotatably attached to the park pawl against which a lower bearing surface of the actuating member is configured to bear, wherein the actuating member moves horizontally, only along a longitudinal direction of the park pawl; and
an actuator support roller against which an upper bearing surface of the actuating member is configured to bear and which is configured to assist the actuating member in pressing against the roller member of the park pawl to cause the park pawl to pivot, wherein the actuating member is configured to move horizontally from a first position to a second position such that a release section and a lock section of the actuating member move horizontally and engage the roller member of the park pawl in succession for controlling the park pawl to pivotally move to the park lock position and configured to move horizontally from the second position to the first position such that the lock section and the release section of the actuating member move horizontally and engage the roller member of the park pawl in succession for controlling the park pawl to pivotally move to the park release position;

wherein the roller member and the actuator support roller decrease frictional force arising when the actuating member moves into contact with the park pawl for causing the park pawl to pivot.

12. The vehicle of claim 11, wherein the park lock system further comprises:

a spring arrangement arranged to move the park pawl to the park release position upon the actuating member not causing the park pawl to pivot to the park lock position.

13. The vehicle of claim 12, wherein the spring arrangement comprises a return spring configured to be attached to the park pawl in one end and attached to the vehicle in another end.

14. The vehicle of claim 11, wherein the park lock system further comprises an actuator connected to the actuating member and being configured to cause the park pawl to pivot.

15. The vehicle of claim 14, wherein the park lock system further comprises:

an actuator rod via which the actuator is connected to the actuating member.

16. The vehicle of claim 15, wherein the actuating member is slidably arranged on the actuator rod.

17. The vehicle of claim 14, wherein the lower bearing surface of the actuating member is configured to be downwardly inclining in a direction from the park pawl to the actuator.

18. The vehicle of claim 11, wherein the actuating member comprises:

the release section, the upper bearing surface of which is configured to bear against the actuator support roller and the lower bearing surface of which is configured to bear against the roller member when the park pawl is in the park release position; and the lock section, the upper bearing surface of which is configured to bear against the actuator support roller and the lower bearing surface of which is configured to bear against the roller member when the park pawl is in the park lock position, wherein the lower bearing surface is configured to be downwardly inclining from the release section to the lock section.

19. The vehicle of claim 11, wherein the upper bearing surface of the actuating member is configured to be planar.

20. The vehicle of claim 11, wherein the park pawl comprises a lock end configured to move into engagement with a space between two teeth of a parking gear of the vehicle upon the park pawl being moved into the park lock position by the actuating member.

* * * * *